US 6,626,400 B1

(12) United States Patent
Booth (10) Patent No.: US 6,626,400 B1
(45) Date of Patent: Sep. 30, 2003

(54) PARACHUTE DEPLOYMENT SYSTEM AND METHOD

(76) Inventor: William R. Booth, 2317 E. New York Ave., Deland, FL (US) 32724

( * ) Notice: Subject to any disclaimer, the term of this patent is extended or adjusted under 35 U.S.C. 154(b) by 0 days.

(21) Appl. No.: 09/691,517

(22) Filed: Oct. 18, 2000

Related U.S. Application Data (60) Provisional application No. 60/160,234, filed on Oct. 18, 1999, provisional application No. 60/204,077, filed on May 12, 2000, and provisional application No. 60/167,213, filed on Nov. 24, 1999.

(51) Int. Cl.[7] ............................................... B64D 17/40
(52) U.S. Cl. ....................................................... 244/149
(58) Field of Search ................................ 244/142, 146, 244/147, 148, 149, 150, 151 R, 152

(56) References Cited

U.S. PATENT DOCUMENTS

| | | | |
|---|---|---|---|
| 1,332,143 A | * | 2/1920 | Osterday ..................... 244/149 |
| 1,909,158 A | * | 5/1933 | Albihn ........................ 244/147 |
| 3,464,653 A | | 9/1969 | Basnett |
| 3,690,604 A | | 9/1972 | Guilfoyle |
| 3,765,627 A | | 10/1973 | Snyder |
| 3,934,848 A | | 1/1976 | Snyder |
| RE29,024 E | | 11/1976 | Reffell |
| 4,030,689 A | | 6/1977 | Rodriguez |
| 4,033,528 A | | 7/1977 | Diggs |
| 4,039,164 A | * | 8/1977 | Booth ......................... 244/149 |
| 4,262,865 A | | 4/1981 | Smith |
| 4,337,913 A | | 7/1982 | Booth |
| 4,399,969 A | | 8/1983 | Gargano |
| 4,428,102 A | | 1/1984 | Brownell |
| 4,505,444 A | | 3/1985 | Martin |
| 4,637,577 A | | 1/1987 | Miseyko et al. |
| 4,709,885 A | | 12/1987 | Martin |
| 4,746,084 A | | 5/1988 | Strong |
| 4,923,150 A | | 5/1990 | Calkins et al. |
| 5,205,517 A | | 4/1993 | Reuter |
| 5,232,184 A | | 8/1993 | Reuter |
| 5,309,412 A | | 5/1994 | Bourgeois |
| 5,386,781 A | | 2/1995 | Day |
| 5,544,846 A | | 8/1996 | Stroud |
| 5,816,535 A | | 10/1998 | Underwood, Jr. et al. |
| 5,816,878 A | | 10/1998 | McNamee |
| 5,899,415 A | | 5/1999 | Conway et al. |
| 6,056,242 A | | 5/2000 | Collins |

FOREIGN PATENT DOCUMENTS

| | | | | |
|---|---|---|---|---|
| DE | 739231 | * | 9/1943 | ................. 244/148 |
| FR | 2317171 | | 7/1975 | |
| WO | WO93/13982 | | 7/1993 | |

* cited by examiner

*Primary Examiner*—Galen L. Barefoot
(74) *Attorney, Agent, or Firm*—Allen, Dyer, Doppelt, Milbrath & Gilchrist, P.A.

(57) ABSTRACT

A parachute system operable with a drogue parachute includes a bridle and kill line connected to a deployment bag at one end and to the drogue parachute at another. The bridle includes a stop carried within the parachute container for suspension of the parachute container by the drogue parachute during free fall. A plate is carried within the parachute container for securing the stop when the flaps are in a locked and closed position by a closing member and ripcord. The ripcord includes a ripcord pin and a ripcord line passing through an eyelet of the ripcord pin and attached at a fixed end to the parachute container for providing a pulley effect and thus a mechanical advantage when the free end of the ripcord is pulled. The ripcord further includes left and right lines carried within a housing and an elastic cord between their free ends for biasing ripcord handles against the ripcord housing. To further prevent an out of sequence deployment of the drogue parachute and main parachute, a safety pin is carried by the bridle outside the parachute container and is connected to the ripcord pin for preventing removal of the ripcord pin from the closing member until deployment of the drogue parachute causes the bridle to pull the safety pin from the ripcord pin, thus allowing the ripcord line to pull the ripcord pin from the closing member only after the drogue parachute has been deployed.

63 Claims, 10 Drawing Sheets

PARACHUTE DEPLOYMENT SYSTEM AND METHOD

Cross Reference To Related Application

This application for patent incorporates by reference and claims the benefit of pending Provisional Applications having Ser. Nos. 60/160,234 and 60/204,077 filed Oct. 18, 1999 and May 12, 2000 respectively, for "Mechanism Used For Drogue Equipped Parachute Deployment Where The Container Closing And Opening System Is The Same Apparatus Used To Respectively Retain And Release The Drogue Parachute," and Ser. No. 60/167,213 filed Nov. 24,1999 for "Drogue Parachute Collapse Apparatus And Method," all commonly owned with the instant application.

FIELD OF THE INVENTION

The invention relates generally to parachute deployment systems, and more particularly to a drogue equipped parachute deployment integrating main parachute container release and drogue parachute release systems.

BACKGROUND OF THE INVENTION

Parachute systems often utilize drogue parachutes to both stabilize and slow the fall rate of heavy loads prior to deploying the main parachute. To open the main parachute of a drogue equipped parachute system, the trailing drogue is first released. This in turn, and separately, pulls a ripcord pin that allows the parachute container to open, and the main parachute to deploy. For a successful main parachute deployment, both the drogue release system and the main parachute container opening system must function in the correct order, and in rapid succession. However, because these two systems are typically separate systems, it is possible for one to function without the other, or to release in the wrong order. By way of example, it is dangerous for the drogue parachute to release or collapse without opening the main parachute container, or for the main parachute container to open without the drogue parachute being released or collapsed. The results of such out of sequence function is frequently fatal.

By way of further example, for typical tandem parachute systems, the drogue parachute is attached to the parachute system harness, either above or below the main parachute container as illustrated by wave example with reference to U.S. Pat. No. 4,746,084 to Strong. The release mechanism for the drogue parachute is typically a well known three ring release as described in U.S. Pat. No. 4,337,913 to Booth, which release mechanism is separate and apart from the main parachute container closing system. Typically, the main parachute container is held closed by a pin which is connected to the drogue bridle or kill line. The drogue parachute is then separately attached to the parachute harness by the three ring release as disclosed, by way of example, in the above referenced Strong '084 patent.

Typically, when the drogue parachute is deployed, jumpers are suspended from a point which is either above or below the main parachute container. This yields a drogue fall position that is either "head high" or "head low" when compared to a desirable "face the earth" position. By way of example, when the drogue parachute is released, the pin on the drogue bridle opens the main parachute container as the drogue departs. The jumper releases the drogue and the drogue pulls the pin for opening the main parachute container as it departs. In addition to generally being complicated to assemble, existing known parachute systems are subject to inherent malfunctions, some fatal. By way of example, one malfunctions well known in the art of sky diving includes an out of sequence deployment where the main parachute container is opened accidentally while the drogue parachute is still attached or inflated. Typically, this results in a hard to deal with "horseshoe" condition, which has been fatal in many incidents. There remains a need to guarantee a proper deployment sequencing of the drogue and main parachutes.

In addition to the releasing of the drogue parachute as above described and as illustrated with reference to the Strong '084 patent, the drogue parachute also serves as a pilot parachute which deploys the main parachute when a desired altitude is reached. However, once the main parachute is opened, the aerodynamic drag of the drogue parachute reduces performance of the main parachute. To solve this performance problem, drogue parachutes have been designed to collapse a limited amount after the drogue is released from its function of slowing down the decent, or after the main parachute has been deployed. Typically, this is accomplish by inverting the apex of the drogue parachute using a kill line as described, by way of example, in U.S. Pat. No. 4,399,969 to Gargano for a gliding parachute. the kill line travels through the center of the drogue canopy and is generally sandwiched between layers of webbing which form the drogue bridal. In typical parachute systems, the kill line and drogue bridle are not connected to each other at the main canopy end of the assembly. The bridal is connected either to the deployment bag, or to a release mechanism, or both, but not to the main parachute. The kill line is only connected to the main parachute. Typically, the kill line travels through the two later bridal as described in the Gargano '969 patent for collapsing the pilot parachute to reduce drag on the main parachute to thereby improve the glide ratio of the main parachute. It is further well known in the art to use a metal ring attached to the of a drogue or pilot parachute. The ring and the bridle are free to move along the kill line as far as its own inertia will allow. Because of this, the amount of collapse must be limited by other means such as a bridal stop.

Such well-known designs present problems. By way of example, the entire deployment bag lift off load is taken by the kill line. If the kill line breaks, the drogue parachute is lost. Further, a kill line failure may foul deployment of the main parachute canopy possibly causing entanglement. During the drogue collapse sequence, the upper bridal stop near the apex of the drogue canopy forcibly strikes its base as it limits the drogue's collapse, causing excess wear. During the collapse sequence, the released drogue bridal "scrunches up" causing a "Chinese finger lock" styled configuration that then slides typically six to nine feet, and at a high speed, up the kill line causing excessive wear. Because the kill line is not directly connected to the drogue bridal at both ends, the drogue bridal can rotate around kill line during canopy descent. Such twists are often hard to detect and difficult untwist before the next use. If the twists are not removed before subsequent jumps, jumper injury and canopy damage may result, as well as decreased main parachute performance to drag. If the drogue is packed for another jump while still in its collapse position, it will not fully inflate in free fall. This can cause a higher free fall velocity, resulting less reliable and often harder parachute openings. This in turn can cause canopy damage and injury to the jumper, or jumpers in the case of a tandem system. The excess wear creates the need for costly drogue repairs.

Many more example of parachute system failures are documented and can be described resulting in the well known understanding that there continues to be a need in the art of sky diving to reduce parachute system failures and in particular, reduce fatalities in the business or the sport of sky diving. The present invention seeks to reduce parachute system failures and especially those which have been known to result in fatality for those parachute systems which employ a drogue parachute and the like.

SUMMARY OF THE INVENTION

In view of the foregoing background, it is therefore an object of the invention to provide for a failure free release or collapse of a drogue parachute when the main parachute is deployed. It is further an object of the present invention to provide a safe parachute deployment system that will prevent well known skydiving fatalities such as those occurring from tandem parachuting incidents resulting from a broken closing loop; collapsed drogue in tow; deployed reserve parachute before breaking away main parachute; an improper drogue three ring assembly; no, late, or low pull of reserve parachute; main container opened on step or opened after exit; a mis-routed kill line; no drogue release; nonstandard drogue release jammed; out of sequence deployment; packed high speed malfunction; rigging error; and use of an unapproved aircraft, by way of example. It is further an object to provide a desirable body position during drogue parachute deployment while the jumper is in free fall.

These and other objects, advantages and features of the present invention are provided by a parachute system comprising a parachute container having a tray portion for packing a main parachute therein and a plurality of flaps operable therewith for enclosing the packed main parachute within the parachute container when the flaps are in a closed position. A bridle, including a stop carried at median portion thereof, has its proximal end operable with the main parachute and its distal end operable with a deceleration styled parachute, such as a drogue parachute, carried outside the parachute container. The bridle extends outwardly from Within the parachute container through the folded flaps for suspension of the parachute container by the deceleration styled parachute while the stop is secured within the parachute container by the flaps in the closed position. A closing member, such as a closing line loop, is connected to the flaps for holding them in the closed position and securing the stop and the packed parachute within the parachute container. A ripcord operates with the closing member for unlocking the flaps to release the stop and permit the bridle to pull the main parachute from the parachute container under a pulling force from the deceleration styled parachute, thus initiating deployment of the main parachute.

In one embodiment of the invention herein described, a plate is carried within the parachute container for receiving the bridle therethrough and securing the stop thereto when the flaps are in the closed position. Embodiment of the plate may include, by way of example, a disk having a tube extending therefrom and outwardly from the container through the plurality of flaps, or a stiffener portion of a deployment bag within which the main parachute is carried.

In one embodiment of the ripcord, a ripcord pin is operable with the closing member for removably securing the closing member and thus locking the flaps in the closed position. A ripcord line connected the pin is used for pulling the pin from engagement with the closing member for unlocking the flaps. In one embodiment, the ripcord line passes through an eyelet of the ripcord pin for slidable engagement therewith. A fixed end of the ripcord line is attached to the parachute container and a free end provided for manual pulling when releasing the ripcord pin from the closing member. With such an arrangement, the ripcord pin provides a pulley styled engagement with the ripcord line thus providing a mechanical advantage for the jumper when manually pulling the ripcord line. For additional safety and convenience to the jumper, one embodiment of the ripcord includes a left hand ripcord line and a right hand ripcord line with portions of the lines carried within a ripcord housing. An elastic cord extends between the free ends of each line for biasing handles attaches at each free end toward the ripcord housing.

To further prevent an out of sequence deployment of the drogue parachute and main parachute, by way of example, a safety pin carried by the bridle at a median location outside the parachute container is connected to the ripcord pin for preventing removal of the ripcord pin from the closing member. Tension on the bridle resulting from deployment of the drogue parachute pulls the safety pin from the ripcord pin thus allowing the ripcord line to pull the ripcord pin from the member only after the drogue parachute has been deployed.

In one embodiment of the present invention, a deployment bag is carried within the parachute container and is connected to the main parachute. The bridle is connected to the deployment bag. To meet one need earlier expressed, a kill line, carried by the bridle, is attached at one end to the deployment bag, as is the bridle itself, and at an opposing end to an apex of the drogue parachute, or deceleration styled parachute.

A method aspect of the present invention includes a method which provides safe deployment of a main parachute operable with a deceleration styled parachute. The method includes packing a main parachute in a parachute container and enclosing the packed main parachute therein with flaps folded in a closed position, attaching a proximal end of a bridle to the main parachute for deployment thereof, or alternatively to a parachute deployment bag within which the main parachute is carried, and attaching a distal end of the bridle to a deceleration styled parachute, such as a drogue parachute, carried outside the parachute container. The bridle extends outwardly from within the parachute container through the folded flaps for suspension of the parachute container by the deceleration styled parachute while a stop on the bridle is secured within the parachute container by the flaps in the closed position. The method further includes securing the flaps in the closed position with a closing member for holding the flaps in the closed position and securing the stop and the packed parachute within the parachute container, and connecting a ripcord to the closing member for unlocking the flaps and releasing the stop, thus permitting the bridle to pull the main parachute from the parachute container under a pulling force from the deceleration styled parachute, thus deploying the main parachute.

A method aspect of the invention further includes placing the deployment bag within a parachute container for enclosing the deployment bag within the parachute container when the flaps are in a closed position, attaching a proximal end of a bridle to the deployment bag and a distal end to the deceleration styled parachute carried outside the parachute container, attaching one end of a kill line to the deployment bag and an opposing end of the kill line to the deceleration styled parachute, locking the plurality of flaps in the closed position for securing the deployment bag and thus the parachute within the parachute container, deploying the deceleration styled parachute for altering a free falling condition, and unlocking the plurality of flaps for causing the bridle to pull the deployment bag from the parachute container to thus initiate deploying the main parachute. In one embodiment, the method includes attaching the kill line to the deployment at the same location as the bridle attachment to the deployment bag.

The method aspect of the invention further includes attaching a safety pin to the bridle at a location outside the parachute container and engaging a safety pin with the ripcord pin for preventing removal of the ripcord pin from the closing member, wherein tension on the bridle resulting from deployment of the deceleration styled parachute disengages the safety pin from the ripcord pin thus allowing the ripcord line to pull the ripcord pin from the closing member only after deployment of the deceleration parachute.

BRIEF DESCRIPTION OF THE DRAWINGS

A preferred embodiment of the invention as well as alternate embodiments are described by way of example with reference to the accompanying drawings in which.

DETAILED DESCRIPTION OF THE PREFERRED EMBODIMENT

The present invention will now be described more fully herein after with reference to the accompanying drawings, in which preferred embodiments of the invention are shown This invention may, however, be embodied in many different forms and should not be construed as limited by the embodiments set forth herein. Rather, these embodiments are provided so that this disclosure will be thorough and complete, and will fully convey the scope of the invention to those of ordinary skill in the art. Like numbers refer to like elements throughout.

Figure 1:
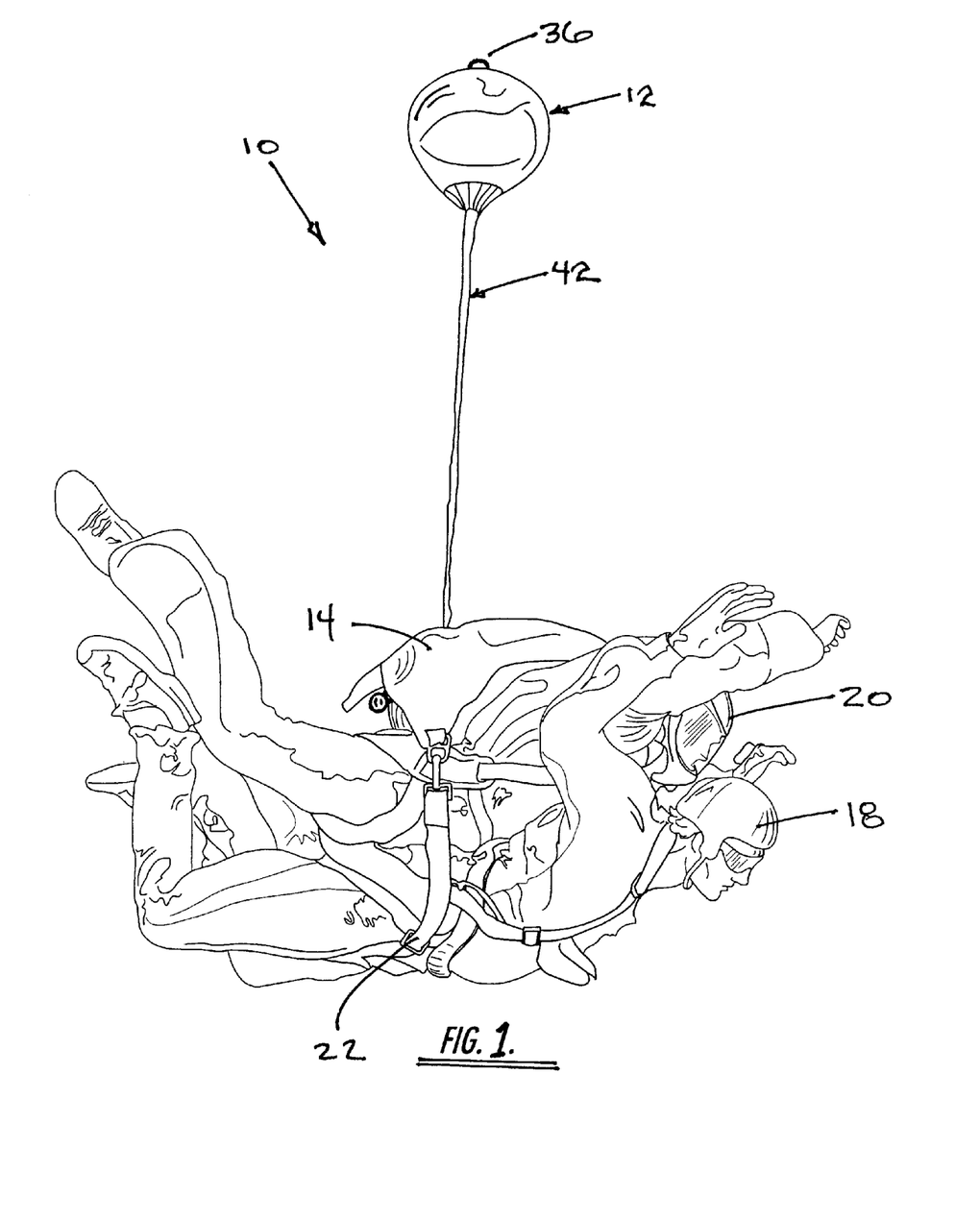
FIG. 1 is a perspective view of one parachute system of the present invention illustrated, by way of example, in a tandem sky diving scenario.

Referring now initially to FIG. 1, one embodiment of the present invention, a tandem parachute system 10, comprises a drogue parachute 12 connected at the center of a main parachute container 14 for providing a desirable head high drogue-fall position 16, for simulating an individual free fall condition for the student 18 learning to sky dive during a tandem dive with an instructor 20. The tandem student/ linstructor pair 18, 20 are not suspended from the harness 22 as earlier described, by way of example, for parachute systems typical in the art.

Figure 2:
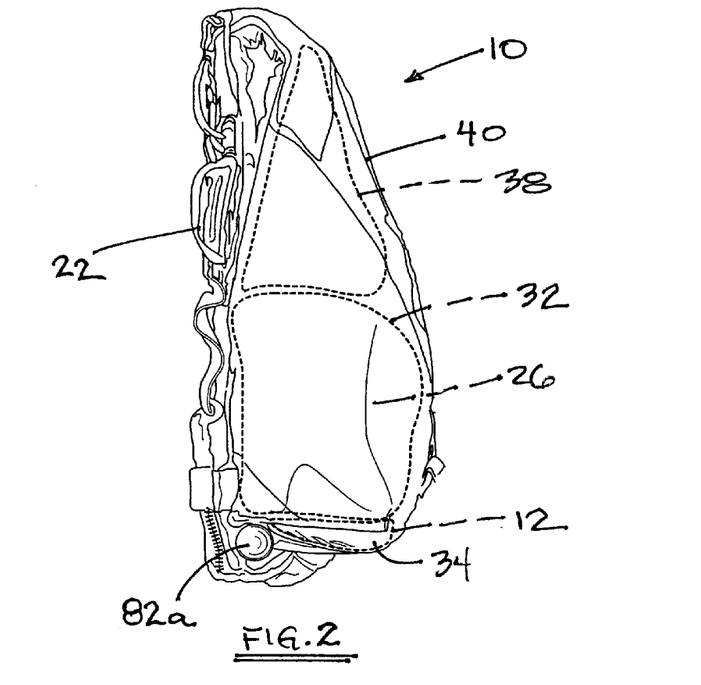
FIG. 2 is a side view of one embodiment of the parachute system of FIG. 1.
Figure 3:
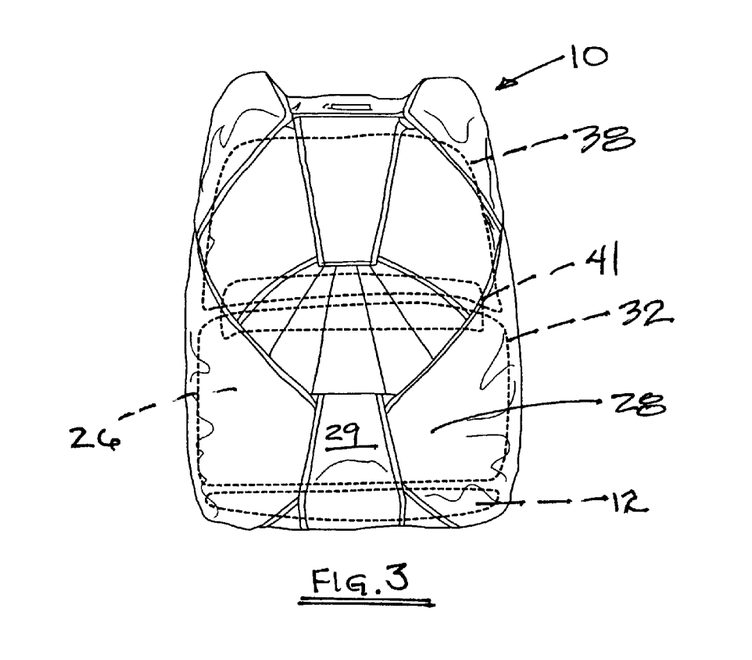
FIG. 3 is a rear view of the embodiment of FIG. 2.
Figure 4:
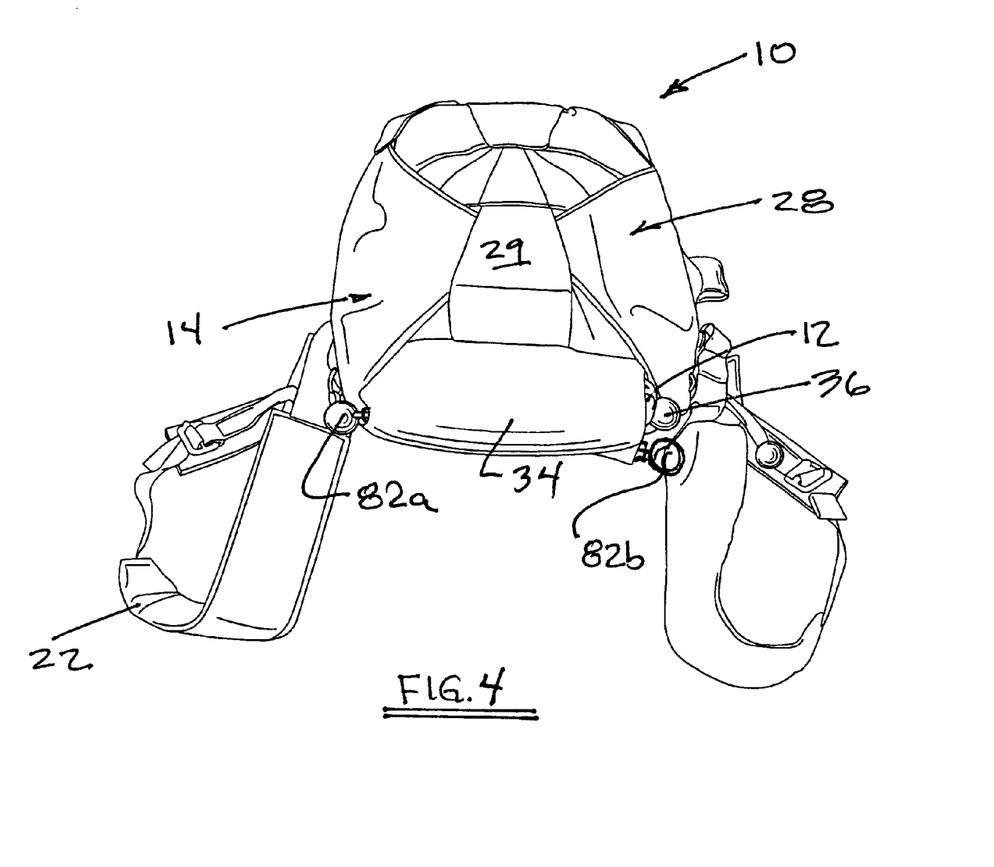
FIG. 4 is a bottom and rear perspective view of the parachute system of FIG. 1.

As illustrated with reference to FIGS. 2–4, the tandem parachute system 10, herein described by way of example, includes the parachute container 14 having a tray portion 24 for packing a main parachute 26 therein and a plurality of flaps 28 for enclosing a packed main parachute within the parachute container when the flaps are in a closed position. In the embodiment herein described by way of example, the main parachute 26 is carried within a deployment bag 32 as is typical in the art. However, it will be clear to those of ordinary skill in the art that the present invention way include packing a main parachute, reserve parachute, and the like in various ways without departing from the teachings of the present invention. With continues reference to FIGS. 2–4, the drogue parachute 12, herein described by way of example for a deceleration styled parachute, is carried within a drogue pouch 34 outside and below the main parachute container 14 for easy manual deployment by the instructor 20 reaching for the drogue parachute handle 36 and pulling the drogue parachute from the pouch. A reserve parachute 38 forms a part of the system 10 and in carried within a reserve parachute container 40 above the main parachute container 14. Alternate drogue storage 41 may place the drogue parachute 12 between the main and reserve parachute containers 14, 40.

Figure 5:
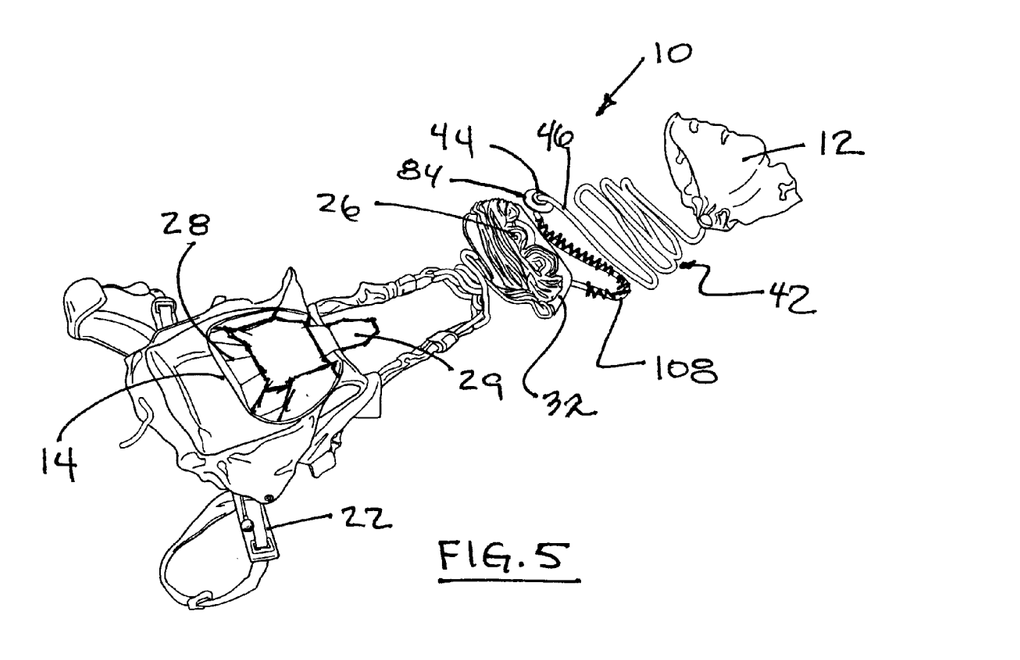
FIG. 5 is an unpacked system view of the embodiment of FIG. 1 illustrating elements of the embodiment.
Figure 6:
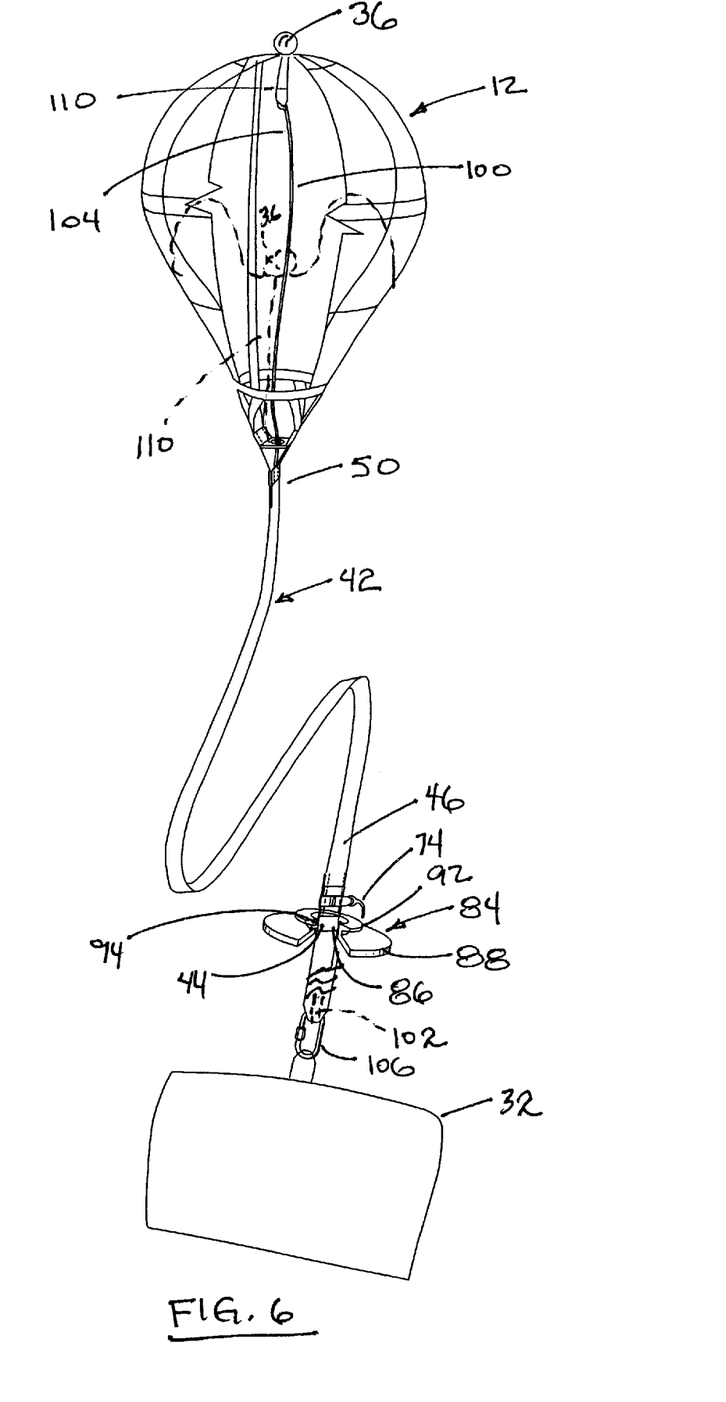
FIG. 6 is a partial perspective view of a drogue parachute and deployment elements of the embodiment of FIG. 1.

With reference again to FIG. 1 and to FIGS. 5 and 6, a bridle 42 includes a stop 44 carried at median portion 46 of the bridle. The bridle 42 has its proximal end 48 connected the deployment bag 32, which bag is connected to the main parachute 14 for deployment thereof. It is expected that the embodiments herein presented by way of example for the present invention will make the reader appreciate that the proximal end 48 may be connected directly to the main parachute 26 without departing from the intent and teachings of the present invention. A distal end 50 is connected to the drogue parachute 12. When the drogue parachute 12 is deployed as illustrated with reference again to FIG. 1, the bridle 42 extends outwardly from within the main parachute container 14 through the folded flaps 28 for suspension of the parachute container by the drogue parachute while the stop 44 is secured within the main parachute container by the flaps in the closed position 30.

Figure 7:
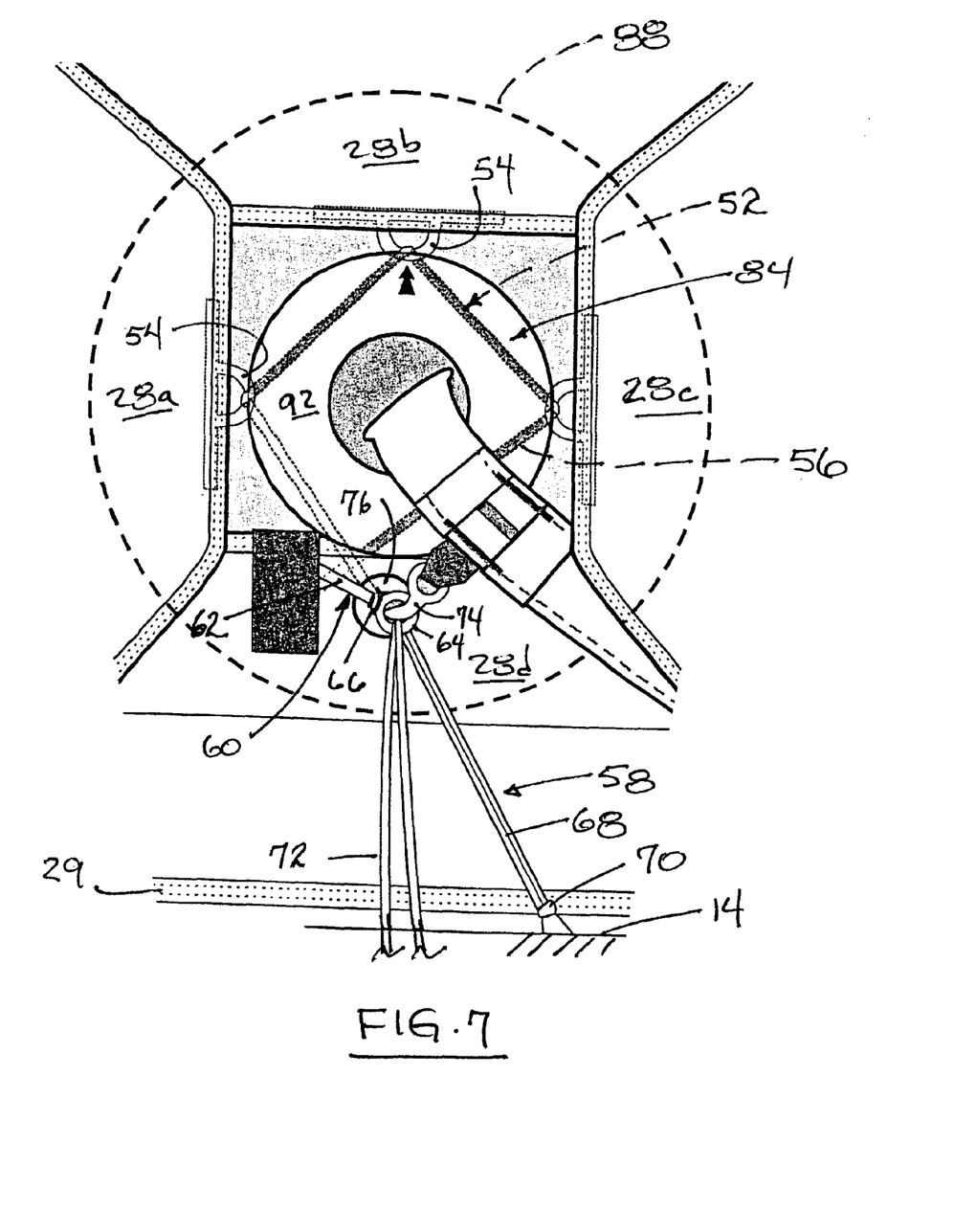
FIG. 7 is a partial enlarged view of a flap portion of a main parachute container illustrating one closing configuration thereof.

As illustrated with reference to FIG. 7, a closing member 52 is operable with the plurality of flaps 28 for locking the flaps in the closed position 30 and thus securing the stop 44 and the packed main parachute 26 within the parachute container 14. For clarity, a flap cover 29 illustrated with reference again to FIG. 4, is not shown in FIG. 7. For the system 10 herein described, the flaps 28 have D-rings 54 attached to each of four flaps 28a, 28b, 28c, 28d providing apertures for receiving a line 56 of the closing member 52 therethrough for securing the flaps 28 in the closed position 30. A ripcord 58 includes a ripcord pin 60 having a shaft portion 62 and an eyelet 64. The shaft 62 of the ripcord pin 60 passes through a loop 66 within an end of the closing member 52 for locking the closing member 52 and thus the flaps 28 in the closed position 30. The ripcord 58 includes a ripcord line 68 connected to the ripcord pin 60 for pulling the pin from engagement with the loop 66 for unlocking the flaps 28.

It may be useful to note at this point in the description that pulling the ripcord 58 both releases the drogue parachute 12 from its pull on the main container 14 and may in fact be released from the main container. Further, pulling of the ripcord 58 simultaneously causes the flaps 28 to open for initiating deployment of the main parachute 26, the main parachute opening and drogue release now being one operation, thus practically eliminating out-of-sequence deployment malfunctions. For the system 10 herein described by way of example, it is desirable to keep the drogue parachute 12 with the system 10 to avoid loss or damage to the drogue parachute, and continue to use the drogue parachute in a partially deflated position as a pilot chute for enhancing deployment if the main parachute as will herein be described in further detail.

With reference again to FIG. 7, one preferred arrangement of the ripcord 58 includes the ripcord line 68 passing through the eyelet 64 for slidable engagement therewith, and a fixed end 70 of the ripcord line coming back on the ripcord line and attached to the parachute container 14. The free end 72 of the ripcord line 68 is used for manual pulling to release the ripcord pin 60 from the loop 66 of the closing member 56, thus unlocking the flaps 28. With such an arrangement, the ripcord pin 60 acts as a pulley for the ripcord line 68, thus providing a mechanical advantage when the free end 72 is pulled, for releasing the stop 44 and permitting the bridle 42 to pull the deployment bag 32 and thus the main parachute 26 from the parachute container 14 under a pulling force from the drogue parachute 12, thus initiating deployment of the main parachute after deployment of the drogue parachute. Further, and with continued reference to FIGS. 6 and 7, a safety pin 74 is carried by the bridle 42 at a location outside the parachute container. The safety pin 74, a hooked eye styled pin, engages the eyelet 64 of the ripcord pin 60 for preventing removal of the ripcord pin from the loop 66. For the embodiment herein described by way of example, the safety pin 74 engages both the eyelet 64 and a final closing grommet 76 within the flap 28d, thus locking the ripcord pin 60 in place until tension on the bridle 42, resulting from deployment of the drogue parachute 12 disengages the safety pin 74 from the ripcord pin for allowing the ripcord line 68 to pull the ripcord pin from the loop 66 of the closing member 52 only after deployment of the drogue parachute.

Figure 8:
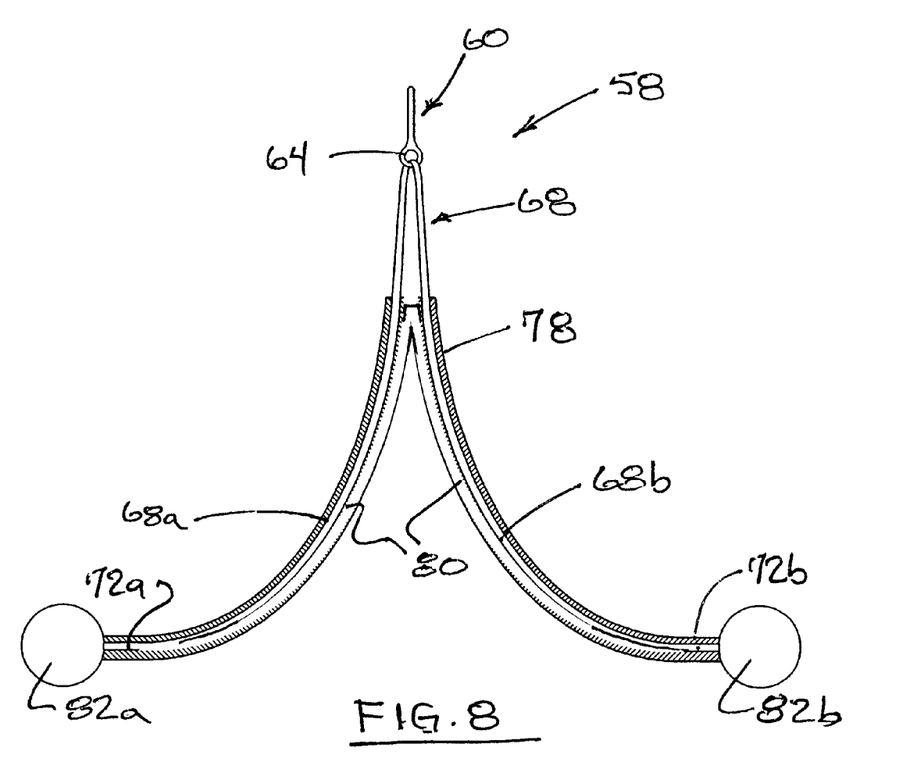
FIG. 8 is a partial cross section of one ripcord embodiment illustrated for use in the embodiment of FIG. 1.

As illustrated with reference again to FIG. 4, and to FIG. 8, one embodiment of the ripcord 58 includes a left hand ripcord line 68a and a right hand ripcord line 68b, wherein at least a portion of each line is carried within a ripcord housing 78. The ripcord 68 further includes an elastic cord 80 extending between the free ends 72a, 72b of each line 68a, 68b for biasing left and right handles 82a, 82b at each free end toward the ripcord housing 78, thus conveniently positioning the handles at established locations for easy reach by the instructor 20, or student 18 should it be needed, and allowing each handle to return to the same place.

With reference again to FIGS. 6 and 7, in one embodiment of the present invention, a plate 84 is carried within the parachute container 14. The plate 84 includes an aperture 86 for receiving the bridle 42 therethrough while securing the stop 44 to the plate when the flaps 28 are in the closed position 30, as earlier described. The plate 84 includes a disk portion 88 which is carried within the parachute container 14, and a tube portion 90 extending outside the container 14 through spaces between the flaps 28. The tube portion further includes a flanged end 92 which serves to position the closing member 52 and keep the plate in a desirable place. A removable stop pin 94 passes through the bridle 42 for connection to the plate 84 for forming the stop 44.

Figure 9:
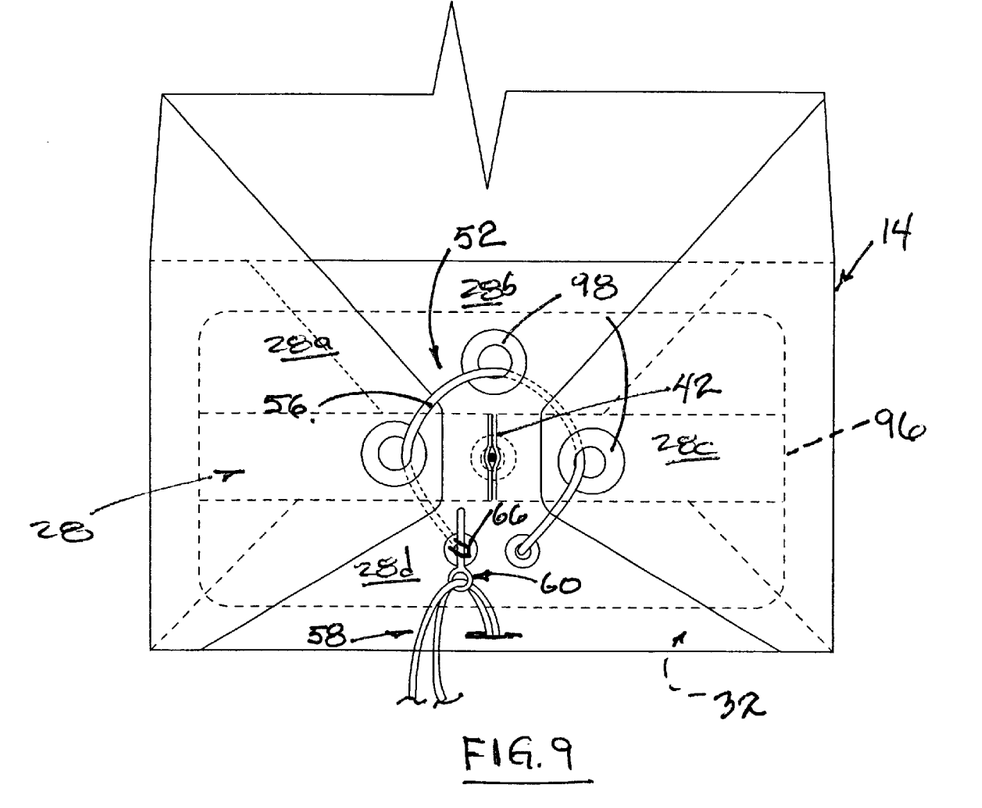
FIG. 9 is a partial top view of a main parachute container illustrating another closing configuration.
Figure 10:
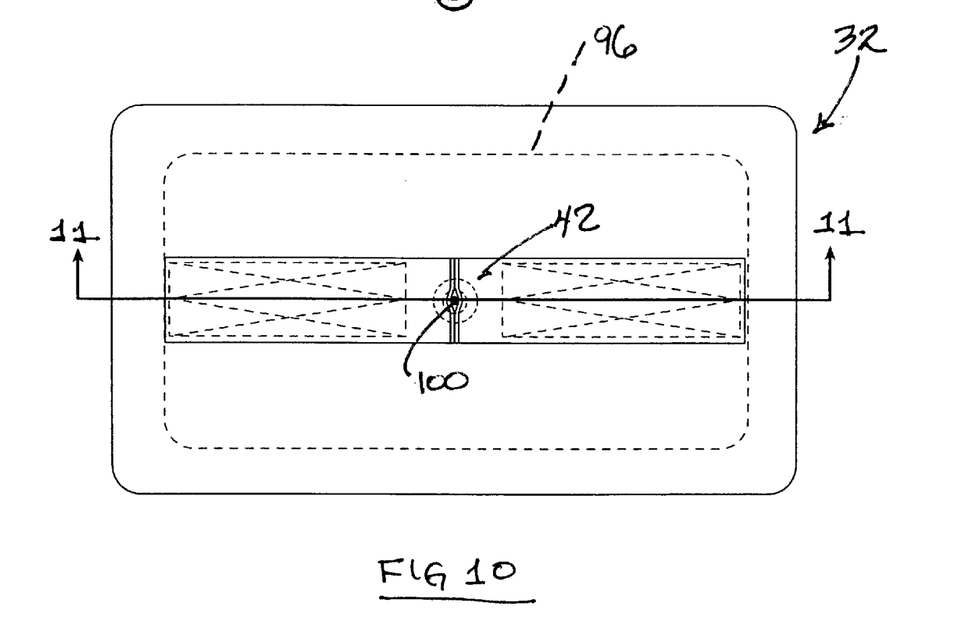
FIG. 10 is a partial top view of one deployment bag.
Figure 11:
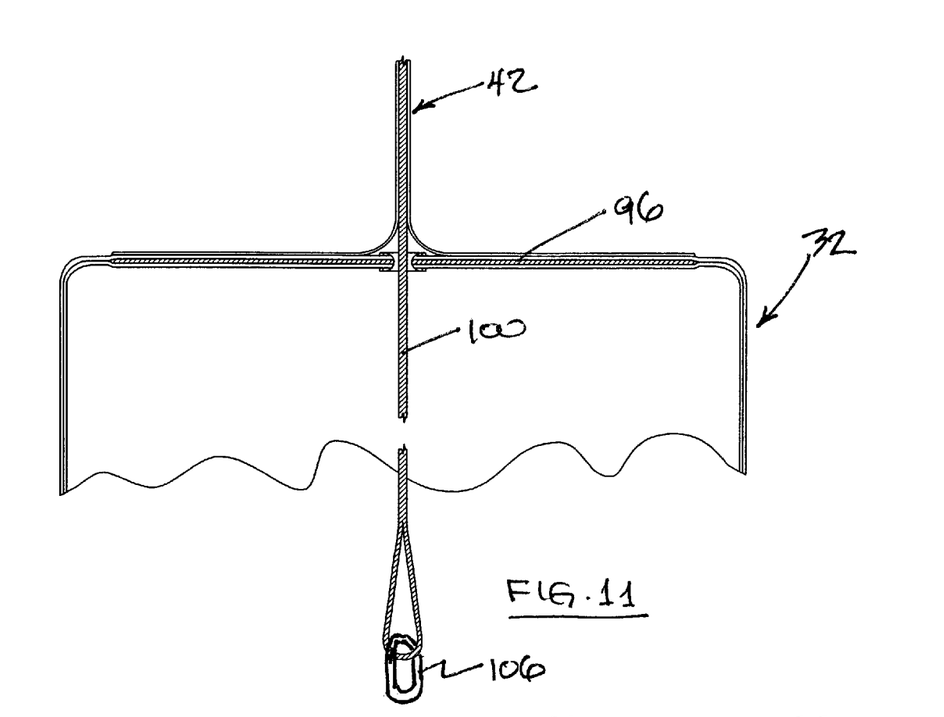
FIG. 11 is a cross-section view taken through lines 11—11 of FIG. 10.

With reference now to FIGS. 9–11, another embodiment of the present invention includes a stiffener 96 within the deployment bag 32, which stiffener performs a function of the plate 84, earlier described. As illustrated with reference to FIG. 9, operation of the releasing of the bridle stop 44 and thus the drogue parachute 12 are as earlier described using the ripcord 58 operable with the closing member 52. As further illustrated, grommeted apertures 98 within each flap 28 secure the closing line 56 of the closing member 52. With both the plate 84 and the stiffener 96, forces applied by the drogue parachute 12 through the bridle 42 help spread the forces across the flaps 28.

Figure 12:
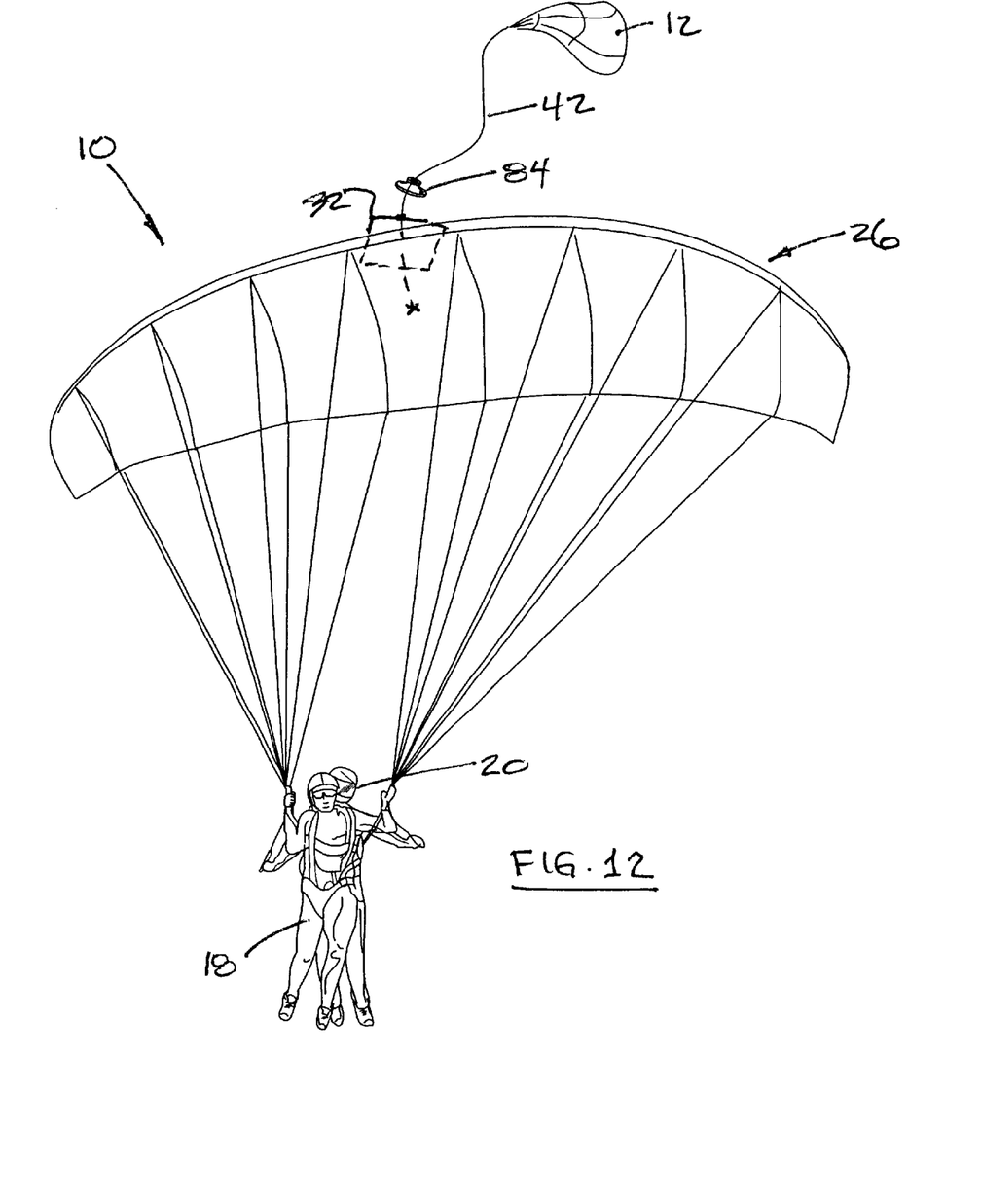
FIG. 12 is a partial perspective view of the parachute system of FIG. 1 illustrating a deployed main parachute and a trailing collapsed drogue parachute.

With reference again to FIGS. 6 and 11, the system 10 further includes a kill line 100 carried by the bridle 42. The kill line 100 is attached at one end 102 to the deployment bag 32 and at an opposing end 104 to an apex of the drogue parachute 12. As herein illustrated, the bridle 42 is a tubular styled bridle which permits the kill line 100 to be carried within the bridle. In the embodiment herein described, the proximal end 48 of the bridle 42 and the one end 102 of the kill line 100 are attached at the same point on the deployment bag 32 using an attachment ring 106. By way of further detail, and with reference again to FIG. 5, when the drogue parachute 12 is set prior to packing, that portion 108 of the bridle 42 between the plate 84 and the deployment bag 32 is "scrunched" or gathered along the kill line 100 in accordion-like fashion, allowing the apex 110 of the drogue parachute 12 to be let out to a high drag, free fall position 112 illustrated with the solid lines of FIG. 6. When the flaps 30 are opened and the plate 84, or deployment bag 32 in the case of the embodiment earlier described with reference to FIGS. 9–11, the gathered portion 108 is extended to thus pull down the apex 110 of the drogue parachute 12, as illustrated with dashed lines of FIG. 6. Because the bridle 42 itself is used to collapse the drogue parachute 12 to a desired limited amount, no additional elements such as an upper bridle stop typically used in the art, is needed. In addition, the above described arrangement has been found to minimized excessive wear on the drogue parachute elements. Further, as a result of attaching the bridle 42 and the kill line 100 to the same point, the attachment ring 106, additional benefits are realized. By way of example, both the kill line and the bridle share the bag liftoff load, thus both can be made from lighter materials for reducing weight and bulk of the parachute system. The drogue apex does not strike the base of the drogue during collapse of the drogue parachute, thus reducing wear on the drogue parachute. The bridle and kill line are prevented from twisting on each other, thus hard openings, jumper injury, and parachute canopy damage caused by twisted kill lines are avoided. Should the kill line break during drogue collapse, the drogue parachute is not lost because it is still connected to the deployment bag or canopy by the bridle. Kill line replacement time and cost is reduced. Further, the above described arrangement permits the drogue parachute to automatically be set in a non-collapsed position during free fall even if it is packed in a collapsed position, thus a desired drogue parachute inflation and main parachute deployment results, as illustrated in FIG. 12.

Accordingly, many modifications and other embodiments of the invention will come to the mind of one skilled in the art having benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. A parachute system comprising:
   a parachute container having a tray portion for packing a main parachute therein and a plurality of flaps operable therewith for enclosing the packed main parachute within the parachute container when the flaps are in a closed position;

a bridle including a stop carried at median portion thereof, the bridle having a proximal end operable with the main parachute for deployment thereof, and a distal end operable with a deceleration styled parachute carried outside the parachute container, the bridle extending outwardly from within the parachute container through the folded flaps for suspension of the parachute container by the deceleration styled parachute while the stop is secured within the parachute container by the flaps in the closed position;

a closing member operable with the plurality of flaps for holding the plurality of flaps in the closed position and securing the stop and the packed parachute within the parachute container; and a ripcord operable with the closing member for unlocking the flaps for releasing the stop and permitting the bridle to pull the main parachute from the parachute container under a pulling force from the deceleration styled parachute, thus initiating deployment of the main parachute.

2. The parachute system according to claim 1, further comprising a plate carried within the parachute container, the plate having an aperture therein for receiving the bridle therethrough while securing the stop thereto when the flaps are in the closed position.

3. The parachute system according to claim 2, wherein the plate includes a disk carried within the parachute container, and a tube extending therefrom and outward from the container through the plurality of flaps, the tube having a flanged end thereon.

4. The parachute system according to claim 2, further comprising a deployment bag for carrying the main parachute therein, and wherein the plate includes a stiffener portion of the deployment bag.

5. The parachute system according to claim 1, wherein the deceleration styled parachute is selected from the group consisting of a drogue parachute and a pilot parachute.

6. The parachute system according to claim 1, wherein at least two of the plurality of flaps includes an aperture for receiving the closing member therethrough.

7. The parachute system according to claim 6, wherein the closing member comprises a line forming a loop with the .plurality of flaps for securing the plurality of flaps in the closed position.

8. The parachute system according to claim 7, wherein the aperture is provided by one of a grommet passing through the flap and a ring affixed to the flap for passing of the line therethrough.

9. The parachute system according to claim 1, wherein the closing member comprises a line having a generally low friction surface, the closing member further having an opening at one end for receiving a pin therethrough and a button secured at an opposing end for securing to the parachute container.

10. The parachute system according to claim 1, further comprising a ripcord pin having a shaft portion and an eyelet, the ripcord pin operable with the closing member for removably securing the closing member and thus locking the plurality of flaps in the closed position, wherein the ripcord includes a ripcord line operable with the ripcord pin for pulling the pin from engagement with the closing member for unlocking the plurality of flaps.

11. The parachute system according to claim 10, wherein the ripcord line passes through the eyelet for slidable engagement therewith, the ripcord line having a fixed end attached to the parachute container and a free end for manual pulling thereof for releasing the ripcord pin from the closing member, thus unlocking the plurality of flaps, the ripcord pin providing a pulley styled engagement with the ripcord line thus providing a mechanical advantage thereto.

12. The parachute system according to claim 10, further comprising a safety pin carried by the bridle at a median location outside the parachute container, the safety pin having a shaft portion extending through the eyelet of the ripcord pin for preventing removal of the ripcord pin from the member, wherein tension on the bridle resulting from deployment of the deceleration styled parachute pulls the safety pin shaft from the ripcord pin thus allowing the ripcord line to pull the ripcord pin from the member.

13. The parachute system according to claim 12, wherein the safety pin comprises an eyeletted pin having a hooked shaped shaft.

14. The parachute system according to claim 10, wherein the ripcord comprises a left hand ripcord line and a right hand ripcord line, and wherein at least a portion of each line is carried within a ripcord housing, the ripcord further including an elastic cord extending between the free ends of each line for biasing the handles at each free end toward the ripcord housing.

15. The parachute system according to claim 1, further comprising a deployment bag carried within the parachute container, wherein the deployment bag is operable with the main parachute and the bridle is operable with the deployment bag.

16. The parachute system according to claim 15, further comprising a kill line carried by the bridle, the kill line attached at one end to the deployment bag and at an opposing end to an apex of the deceleration styled parachute.

17. The parachute system according to claim 16, wherein the bridle is a tubular styled bridle and the kill line is carried within the bridle.

18. A parachute system comprising:

a parachute container having a plurality of flaps for folding thereof and enclosing a packed parachute within the parachute container when the flaps are in a closed position;

a bridle having a proximal end operable with the parachute for deployment thereof, and a distal end operable with a deceleration styled parachute carried outside the parachute container, the bridle extending outwardly from within the parachute container through the folded flaps for suspension of the parachute container by the deceleration styled parachute while the flaps are in the closed position;

a closing member operable with the plurality of flaps for locking the plurality of flaps in the closed position and thus securing the packed parachute within the parachute container;

a ripcord pin having a shaft portion and an eyelet, the ripcord pin engaging the closing member for securing the closing member and thus locking the plurality of flaps in the closed position;

a ripcord line operable with the ripcord pin for pulling the pin from engagement with the closing member to unlock the plurality of flaps and permit the bridle to pull the main parachute from the parachute container under a pulling force from the deceleration styled parachute, thus initiating deployment of the main parachute, wherein the ripcord line passes through the eyelet of the ripcord pin for slidable engagement therewith, the ripcord line having a fixed end attached to the parachute container and a free end for manual pulling thereof for releasing the ripcord pin from the closing member, the ripcord pin providing a pulley styled engagement with the ripcord line thus providing a mechanical advantage thereto.

19. The parachute system according to claim 18, further comprising a deployment bag for carrying the main parachute therein, and wherein the proximal end of the bridle is fixedly attached thereto.

20. The parachute system according to claim 18, wherein the closing member comprises a line forming a loop with the plurality of flaps for securing the plurality of flaps in the closed position.

21. The parachute system according to claim 20, wherein at least two of the plurality of flaps includes an aperture for receiving the closing member therethrough.

22. The parachute system according to claim 18, further comprising a safety pin carried by the bridle at a location outside the parachute container, the safety pin having a shaft portion extending through the eyelet of the ripcord pin for preventing removal of the ripcord pin from the closing member, wherein tension on the bridle resulting from deployment of the deceleration styled parachute pulls the safety pin shaft from the ripcord pin thus allowing the ripcord line to pull the ripcord pin from the closing member.

23. The parachute system according to claim 22, wherein the safety pin comprises an eyeletted pin having a hooked shaped shaft.

24. The parachute system according to claim 18, wherein the ripcord line comprises:
 a ripcord housing;
 a left hand ripcord line and a right hand ripcord line, wherein at least a portion of each left hand and right hand line is carried within the ripcord housing;
 a left hand handle and a right hand handle attached to each of the left hand and right hand ripcord lines, respectively;
 an elastic cord extending between the free ends of each of the left hand and right lines for biasing the handles at each free end toward the ripcord housing.

25. A parachute system comprising:
 a parachute container having a plurality of flaps for folding thereof and enclosing a packed parachute within the parachute container when the flaps are in a closed position;
 a bridle having a proximal end operable with the parachute for deployment thereof, and a distal end operable with a deceleration styled parachute carried outside the parachute container, the bridle extending outwardly from within the parachute container through the folded flaps for suspension of the parachute container by the deceleration styled parachute while the flaps are in the closed position;
 a closing member operable with the plurality of flaps for locking the plurality of flaps in the closed position and thus securing the packed parachute within the parachute container;
 an ripcord pin having a shaft portion and an eyelet, the ripcord pin engaging the closing member for securing the closing member and thus locking the plurality of flaps in the closed position;
 a ripcord line operable with the ripcord pin for pulling the pin from engagement with the closing member to unlock the plurality of flaps and permit the bridle to pull the main parachute from the parachute container under a pulling force from the deceleration styled parachute, thus initiating deployment of the main parachute; and
 a safety pin carried by the bridle at a location outside the parachute container, the safety pin having a shaft portion engaging the eyelet of the ripcord pin for preventing removal of the ripcord pin from the closing member, wherein deployment of the deceleration styled parachute pulls on the bridle which in turn disengages the safety pin from the ripcord pin, thus allowing the ripcord line to pull the ripcord pin from the closing member only after the deceleration styled parachute has been deployed.

26. The parachute system according to claim 25, wherein the ripcord line passes through the eyelet of the ripcord pin for slidable engagement therewith, the ripcord line having a fixed end attached to the parachute container and a free end for manual pulling thereof for releasing the ripcord pin from the closing member, the ripcord pin providing a pulley styled engagement with the ripcord line thus providing a mechanical advantage thereto.

27. The parachute system according to claim 25, further comprising a deployment bag for carrying the main parachute therein, and wherein the proximal end of the bridle is fixedly attached thereto.

28. The parachute system according to claim 25, wherein the closing member comprises a line forming a loop with the plurality of flaps for securing the plurality of flaps in the closed position, and wherein at least two of the plurality of flaps includes an aperture for receiving the closing member therethrough.

29. The parachute system according to claim 25, wherein the safety pin comprises an eyeletted pin having a hooked shaped shaft.

30. A parachute system comprising:
 a parachute container having a plurality of flaps for folding thereof and enclosing a deployment bag within the parachute container when the flaps are in a closed position;
 a deployment bag carried within the parachute container for attaching to a main parachute carried therein;
 a bridle having a proximal end attached to the deployment bag, and a distal end operable with a deceleration styled parachute carried outside the parachute container, the bridle extending outwardly from within the parachute container through the folded flaps for suspension of the parachute container by the deceleration styled parachute while the flaps are in the closed position;
 a kill line carried by the bridle, the kill line attached at one end to the deployment bag and at an opposing end to the deceleration styled parachute; and
 a closing member operable with the plurality of flaps for locking the plurality of flaps in the closed position and securing the deployment bag and thus the parachute within the parachute container.

31. The parachute system according to claim 30, wherein the bridle is a tubular styled bridle and the kill line is slidably carried within the bridle.

32. The parachute system according to claim 30, further comprising:
 a ripcord pin having a shaft portion and an eyelet, the ripcord pin engaging the closing member for securing the closing member and thus locking the plurality of flaps in the closed position;
 a ripcord line operable with the ripcord pin for pulling the pin from engagement with the closing member to unlock the plurality of flaps and permit the bridle to pull the main parachute from the parachute container under a pulling force from the deceleration styled parachute, thus initiating deployment of the main parachute.

33. The parachute system according to claim 32, further comprising a safety pin carried by the bridle at a location outside the parachute-container, the safety pin engaging the eyelet of the ripcord pin for preventing removal of the ripcord pin from the closing member, wherein tension on the bridle resulting from deployment of the deceleration styled parachute disengages the safety pin from the ripcord pin thus allowing the ripcord line to pull the ripcord pin from the closing member.

34. A tandem parachute system comprising:
a main parachute operable with a harness for allowing an instructor and a student to descend in tandem following a free fall;
a parachute container having a tray portion for packing the main parachute therein and a plurality of flaps operable therewith for enclosing the packed main parachute within the parachute container when the flaps are in a closed position;
a drogue parachute carried outside the parachute container, the drogue parachute operable for deployment during free fall for providing a desirable free fall condition;
a bridle including a stop carried at median portion thereof, the bridle having a proximal end operable with the main parachute for deployment thereof, and a distal end operable with the drogue parachute, the bridle extending outwardly from within the parachute container through the folded flaps for suspension of the parachute container by the drogue parachute while the stop is secured within the parachute container by the flaps in the closed position;
a closing member operable with the plurality of flaps for locking the plurality of flaps in the closed position and thus securing the stop and the packed main parachute within the parachute container; and
a ripcord operable with the closing member for unlocking the flaps for releasing the stop and permitting the bridle to pull the main parachute from the parachute container under a pulling force from the drogue parachute, thus initiating deployment of the main parachute after deployment of the drogue parachute.

35. The tandem parachute system according to claim 34, further comprising a plate carried within the parachute container, the plate having an aperture therein for receiving the bridle therethrough while securing the stop thereto when the flaps are in the closed position.

36. The tandem parachute system according to claim 35, wherein the plate includes a disk carried within the parachute container, and a tube extending therefrom and outward from the container through the plurality of flaps, the tube having a flanged end thereon.

37. The tandem parachute system according to claim 35, further comprising a deployment bag for carrying the main parachute therein, and wherein the plate includes a stiffener portion of the deployment bag.

38. The tandem parachute system according to claim 34, wherein at least two of the plurality of flaps includes an aperture for receiving the closing member therethrough, and wherein the closing member comprises a line forming a loop passing through the apertures of the at least two flaps for securing the plurality of flaps in the closed position.

39. The tandem parachute system according to claim 38, further comprising a ripcord pin having a shaft portion and an eyelet, the ripcord pin operable with the loop for securing the closing member and thus locking the plurality of flaps in the closed position, wherein the ripcord includes a ripcord line operable with the ripcord pin for pulling the pin from engagement with the loop for unlocking the plurality of flaps.

40. The tandem parachute system according to claim 39, wherein the ripcord line passes through the eyelet for slidable engagement therewith, the ripcord line having a fixed end attached to the parachute container and a free end for manual pulling thereof for releasing the ripcord pin from the closing member, thus unlocking the plurality of flaps, the ripcord pin providing a pulley styled engagement with the ripcord line thus providing a mechanical advantage thereto.

41. The tandem parachute system according to claim 40, further comprising a safety pin carried by the bridle at a location outside the parachute container, the safety pin engaging the ripcord pin for preventing removal of the ripcord pin from the loop, wherein tension on the bridle resulting from deployment of the drogue parachute disengages the safety pin from the ripcord pin for allowing the ripcord line to pull the ripcord pin from the member only after deployment of the drogue parachute.

42. The tandem parachute system according to claim 40, wherein the ripcord comprises a left hand ripcord line and a right hand ripcord line, and wherein at least a portion of each line is carried within a ripcord housing, the ripcord further including an elastic cord extending between the free ends of each line for biasing the handles at each free end toward the ripcord housing.

43. The tandem parachute system according to claim 34, further comprising a deployment bag carried within the parachute container, wherein the deployment bag is operably attached to the main parachute and the bridle is attached to the deployment bag.

44. The tandem parachute system according to claim 43, further comprising a kill line carried by the bridle, the kill line attached at one end to the deployment bag and at an opposing end to the drogue parachute.

45. The tandem parachute system according to claim 44, wherein the bridle is a tubular styled bridle and the kill line is carried within the bridle.

46. A method providing safe deployment of a main parachute operable with a deceleration styled parachute, the method comprising:
packing a main parachute in a parachute container having a tray portion for carrying the main parachute therein and a plurality of flaps operable for enclosing the packed main parachute within the parachute container when the flaps are in a closed position;
providing a bridle having a proximal end, a distal end, and a median portion therebetween, the bridle further having a stop carried at the median portion;
attaching the proximal end of the bridle the main parachute for deployment thereof;
attaching the distal end of the bridle to a deceleration styled parachute carried outside the parachute container, the bridle extending outwardly from within the parachute container through the folded flaps for suspension of the parachute container by the deceleration styled parachute while the stop is secured within the parachute container by the flaps in the closed position;
securing the flaps in the closed position with a closing member operable with the plurality of flaps for holding the plurality of flaps in the closed position and securing the stop and the packed parachute within the parachute container; and
connecting a ripcord to the closing member for unlocking the flaps and releasing the stop, thus permitting the bridle to pull the main parachute from the parachute container under a pulling force from the deceleration styled parachute, thus deploying the main parachute.

47. The method according to claim 46, further comprising placing a plate within the parachute container for securing the stop thereto when the flaps are in the closed position.

48. The method according to claim 47, wherein the plate includes a disk carried within the parachute container, and a tube extending therefrom and outward from the container through the plurality of flaps.

49. The method according to claim 47, further comprising providing a deployment bag for carrying the main parachute therein and placing the deployment bag within the parachute container, and wherein the plate includes a stiffener portion of the deployment bag.

50. The method according to claim 46, further comprising selecting the deceleration styled parachute from the group consisting of a drogue parachute and a pilot parachute.

51. The method according to claim 46, wherein at least two of the plurality of flaps includes an aperture and the closing member comprises a line, and wherein the method includes forming a loop with the plurality of flaps for securing the plurality of flaps in the closed position.

52. The method according to claim 51, wherein the line has a generally low friction surface, an opening at one end for receiving a pin therethrough, and a button secured at an opposing end secured to the parachute container.

53. The method according to claim 46, further comprising attaching a ripcord pin having a shaft portion and an eyelet, the ripcord pin operable with the closing member for securing the closing member and thus locking the plurality of flaps in the closed position, wherein the ripcord includes a ripcord line operable with the ripcord pin for pulling the pin from engagement with the closing member for unlocking the plurality of flaps.

54. The method according to claim 53, further comprising passing the ripcord line through the eyelet for slidable engagement therewith and attaching a fixed end of the ripcord line to the parachute container, wherein a free end of the ripcord is positioned for manual pulling thereof for releasing the ripcord pin from the closing member, thus unlocking the plurality of flaps, the ripcord pin providing a pulley styled engagement with the ripcord line thus providing a mechanical advantage thereto.

55. The method according to claim 54, further comprising attaching a safety pin to the bridle at a median location outside the parachute container, and engaging the safety pin with the ripcord pin for preventing removal of the ripcord pin from the member, wherein deploying the deceleration styled parachute places tension on the bridle which in turn disengages the safety pin from the ripcord pin, thus allowing the ripcord line to pull the ripcord pin from the member.

56. The method according to claim 54, wherein the ripcord comprises a left hand ripcord line and a right hand ripcord line, at least a portion of each line carried within a ripcord housing, the ripcord further including an elastic cord extending between the free ends of each line for biasing the handles at each free end toward the ripcord housing, and wherein pulling at least one of the handles initiates deploying the main parachute.

57. The method according to claim 46 further comprising carrying a deployment bag within the parachute container, wherein the deployment bag carries the main parachute therein, and wherein the bridle is attached to the deployment bag.

58. The method according to claim 57, further comprising attaching one end of a kill line to the deployment bag and an opposing end at an opposing end to the deceleration styled parachute.

59. The method according to claim 58, wherein the bridle is a tubular styled bridle and the kill line is carried within the bridle.

60. A method for deploying a main parachute operable with a deceleration parachute, the method comprising:

carrying a main parachute within a deployment bag for operation therewith in deploying the main parachute therefrom;

placing the deployment bag within a parachute container having a plurality of flaps for folding thereof for enclosing the deployment bag within the parachute container when the flaps are in a closed position;

attaching a proximal end of a bridle to the deployment bag and a distal end to the deceleration styled parachute carried outside the parachute container, the bridle extending outwardly from within the parachute container through the folded flaps for suspension of the parachute container by the deceleration styled parachute while the flaps are in the closed position;

attaching one end of a kill line to the deployment bag and an opposing end of the kill line to the deceleration styled parachute;

locking the plurality of flaps in the closed position for securing the deployment bag and thus the parachute within the parachute container;

deploying the deceleration styled parachute for altering a free falling condition, the deceleration styled parachute suspending the parachute container from the bridle attached thereto; and unlocking the plurality of flaps for causing the bridle to pull the deployment bag from the parachute container to thus initiate deploying the main parachute.

61. The method according to claim 60, wherein the bridle is a tubular styled bridle and the kill line is slidably carried within the bridle, and wherein the one end of the kill line and the proximal end of the bridle are attached at a same location of the deployment bag.

62. The method according to claim 60, wherein locking the plurality of flaps comprises engaging a ripcord pin with the closing member for securing the plurality of flaps in the closed position, and wherein a ripcord line is operable with the ripcord pin for pulling the pin from engagement with the closing member to unlock the plurality of flaps and permit the bridle to pull the main parachute from the parachute container under a pulling force from the deceleration styled parachute, thus initiating deployment of the main parachute.

63. The method according to claim 62, further comprising attaching a safety pin to the bridle at a location outside the parachute container and engaging a safety pin with the ripcord pin for preventing removal of the ripcord pin from the closing member, wherein tension on the bridle resulting from deployment of the deceleration styled parachute disengages the safety pin from the ripcord pin thus allowing the ripcord line to pull the ripcord pin from the closing member only after deployment of the deceleration parachute.

* * * * *